United States Patent
Chen et al.

(10) Patent No.: US 10,245,931 B2
(45) Date of Patent: Apr. 2, 2019

(54) SEAL ASSEMBLY AND THE ASSEMBLING METHOD THEREOF

(71) Applicant: TAIZHOU VALEO WENLING AUTOMOTIVE SYSTEMS CO., LTD., Wenling Taizhou (CN)

(72) Inventors: Jack Chen, Wenling Taizhou (CN); Xi Chen, Wenling Taizhou (CN); Stéphane Gorce, Wenling Taizhou (CN)

(73) Assignee: TAIZHOU VALEO WENLING AUTOMOTIVE SYSTEMS CO., LTD., Wenling Taizhou (CN)

( * ) Notice: Subject to any disclaimer, the term of this patent is extended or adjusted under 35 U.S.C. 154(b) by 8 days.

(21) Appl. No.: 15/327,811

(22) PCT Filed: Jul. 21, 2015

(86) PCT No.: PCT/CN2015/084605
§ 371 (c)(1),
(2) Date: Jan. 20, 2017

(87) PCT Pub. No.: WO2016/011929
PCT Pub. Date: Jan. 28, 2016

(65) Prior Publication Data
US 2017/0203642 A1 Jul. 20, 2017

(30) Foreign Application Priority Data

Jul. 21, 2014 (CN) .......................... 2014 1 0347536

(51) Int. Cl.
*B60J 10/00* (2016.01)
*B60S 1/04* (2006.01)
(Continued)

(52) U.S. Cl.
CPC ............. *B60J 10/45* (2016.02); *B60S 1/0436* (2013.01); *B60S 1/0438* (2013.01);
(Continued)

(58) Field of Classification Search
CPC ..... B60J 10/45; F16J 15/3276; F16J 15/3268; F16J 15/3256; F16J 15/322; B60S 1/0436; B60S 1/0491
(Continued)

(56) References Cited

U.S. PATENT DOCUMENTS 2,568,056 A * 9/1951 Corder .................... F16C 33/74
174/93
2,731,065 A * 1/1956 Powers ................... B60C 29/02
152/427

(Continued)

FOREIGN PATENT DOCUMENTS

| CN | 101025180 A | 8/2001 |
| CN | 202413711 U | 9/2012 |

(Continued)

OTHER PUBLICATIONS

International Search Report issued in PCT/CN2015/084605 dated Oct. 14, 2015 (3 pages).
(Continued)

*Primary Examiner* — Eugene G Byrd
(74) *Attorney, Agent, or Firm* — Osha Liang LLP

(57) ABSTRACT

A seal assembly (100) is provided, which is used to seal the connection region between a glass (103) and a shaft assembly (108) passing through the glass (103). The shaft assembly (108) may comprise a shaft (113) and a threaded bushing (114) around the shaft (113). The seal assembly (100) may comprise an outer seal (101), which has a body portion (115) supported on the glass (103), and further comprises at least one sealing portion (116) to form at least one sealing area (119, 121); and the seal assembly (100) further comprises an inner rotatable seal (106), which has a body portion (122)

(Continued)

with a thread (128) for engaging a thread (110) of the bushing (114), and which further comprises at least one second sealing portion (123) to form at least one sealing area (124). Therein, the body portion (115) of the outer seal (101) and the body portion (122) of the inner rotatable seal (106) have corresponding threads (102, 107) for engaging the outer seal (101) with the inner rotatable seal (106). The assembly (100) can prevent the water leakage at the connection region between the wiper and the vehicle body effectively. The assembly (100) is easy and convenient to be installed, with high reliability, and has an advantage in appearance.

14 Claims, 4 Drawing Sheets

(51) Int. Cl.
    *B60S 1/34*     (2006.01)
    *B60S 1/58*     (2006.01)
    *F16J 15/3276*     (2016.01)
    *F16J 15/328*     (2016.01)

(52) U.S. Cl.
    CPC ............ *B60S 1/0491* (2013.01); *B60S 1/349* (2013.01); *B60S 1/583* (2013.01); *F16J 15/328* (2013.01); *F16J 15/3276* (2013.01)

(58) Field of Classification Search
    USPC ........................................................ 277/309
    See application file for complete search history.

(56) References Cited

U.S. PATENT DOCUMENTS

| | | | | |
|---|---|---|---|---|
| 3,159,407 A | * | 12/1964 | Strohm | B60B 7/0013 277/353 |
| 3,606,363 A | * | 9/1971 | Jordan | F16B 33/004 277/354 |
| 4,131,286 A | * | 12/1978 | Bainard | F16J 15/3268 277/551 |
| 4,669,737 A | * | 6/1987 | Diffenderfer | F16J 15/3268 277/551 |
| 6,059,294 A | * | 5/2000 | Gorce | B60S 1/34 15/250.34 |
| 6,173,963 B1 | * | 1/2001 | Ho | B25C 1/042 227/130 |
| 7,861,364 B2 | * | 1/2011 | Powell, Jr. | B60S 1/24 15/250.27 |
| 2001/0045747 A1 | * | 11/2001 | Russell | E21B 31/20 285/123.14 |
| 2010/0140528 A1 | * | 6/2010 | McLennan | F16K 7/16 251/366 |
| 2011/0072608 A1 | | 3/2011 | Bohn et al. | |
| 2012/0087715 A1 | * | 4/2012 | Betke | B23P 11/005 403/5 |

FOREIGN PATENT DOCUMENTS

| | | | | |
|---|---|---|---|---|
| CN | 202884012 U | | 4/2013 | |
| CN | 203032623 U | | 7/2013 | |
| EP | 0739794 A1 | * | 10/1996 | ............... B60S 1/34 |
| EP | 0739794 B1 | | 12/1999 | |
| JP | H09301133 A | | 11/1997 | |
| JP | 2014085010 A | * | 5/2014 | ............. B60T 7/107 |

OTHER PUBLICATIONS

Written Opinion of the International Searching Authority issued in PCT/CN2015/084605 dated Oct. 14, 2015 (3 pages).

* cited by examiner

SEAL ASSEMBLY AND THE ASSEMBLING METHOD THEREOF

TECHNICAL FIELD

The invention relates to a seal assembly and the assembling method thereof. The seal assembly is specifically a new-type convenient connection seal assembly for a rotary vehicle wiper.

BACKGROUND

Rear wiper is not only used for wiping water and removing ash, but also acts as an important part of vehicle appearance. The sealing tightness of a rear wiper will be greatly affected by human factors, environmental factors, etc., rendering the rear wiper to leakage. If the performance of the rear wiper seal is not good, it will be easy for the rainwater to leak from the seams between the vehicle body and wiper, which may leads to unpredictable consequences. At the same time, as the market demand, rear wiper installation space is more and more limited by compact body space. Thereby, in some cases the traditional electrical motor with three fixing points cannot be applied, and a new way will be used alternatively, i.e., two of the fixing points are on the vehicle body sheet metal frame, and another fixing point is realized at a glass hole, and this installation way is appreciated by the market.

Given these realities, there are complex technical requirements for the seal connect structure of the rear wiper. The traditional method is to provide sealing rubber gaskets on both sides of the glass, and to provide plastic base parts and clamping nuts on the two sides respectively for sealing purpose. However, this structure has inevitable drawbacks. Firstly the large sealing assembly exposed outside the vehicle body has a harmful effect on the appearance of the vehicle. Secondly, the manufacturing tolerance of the glass has a serious impact on the amount of compression of the rubber gaskets on both sides of the glass, thus the seal effectiveness cannot be assured. Finally, the complicated installation parts prone to cause error during the mounting process, and the expected mounting effect and quality cannot be guaranteed.

SUMMARY

In consideration of the above technical problems encountered with the existed technology, a new-type seal assembly is proposed by the present invention, which can fulfill the installation method in which two fixing points of the electrical motor are on the vehicle body and one fixing point is on the glass, and the seal assembly meets the requirement of good sealing performance and easy installation, and satisfies the demand of the market on the appearance of the rear wiper.

The seal assembly of the present invention may consist primarily of an outer seal, an inner rotatable seal, and annular sealing ring located on the output bushing.

The seal assembly of the present invention prevents the possible leakage in the following three aspects. First, the exterior of the glass and the outer seal themselves are sealed, so as to prevent the rain from slipping into the glass opening. Second, when the output bushing of the wiper is properly installed, the sealing between the output bushing and the outer seal is achieved by placing an interference-fit annular seal ring between the output bushing and the outer seal. Third, an inner rotatable seal is disposed inside the glass, and the thread of the inner rotatable seal is engaged tightly with the thread of the bushing, so that the interior and exterior surfaces of the interjacent glass are both sealed.

Compared with the existed independent sealing method with interior and exterior rubber gaskets, the seal assembly of the present invention has incomparable advantages. At present there are no such kinds of technology that can make the tolerance of the glass controlled at the tolerance level of common parts. Usually the manufacture deviation of the glass is relatively large, and further, due to the installation error and other factors, an uncontrolled state, in which the pressures at the two sides of the glass are different and the amounts of the rubber compression at the two sides are different, will be induced by the traditional sealing method with two separate sealing gaskets, such that the sealing effect cannot be assured. Comparatively, the structure of the present invention makes the seals at the interior and exterior of the glass as a whole. It can clamp the glass therebetween and always make the sealing for the glass in the best state with the balanced exterior and exterior pressure, no matter how large the glass tolerance is. Furthermore, the size of the seal at the exterior side of the glass can be very small and its shape can be changed as required. Meanwhile, the installation is realized by rotating, making the installation, disassembly, maintenance, etc. quite easy. In addition, the product structure is simple and the design of the parts can be standardized, and thus the design cost and product cost can be further saved.

BRIEF DESCRIPTION OF THE DRAWINGS

The above features and advantages and other features and advantages of the present invention are readily apparent from the following detailed description of the best modes for carrying out the invention when taken in connection with the accompanying drawings.

DETAILED DESCRIPTION

Referring to the figures, wherein like numerals indicate like components.

Figure 1:
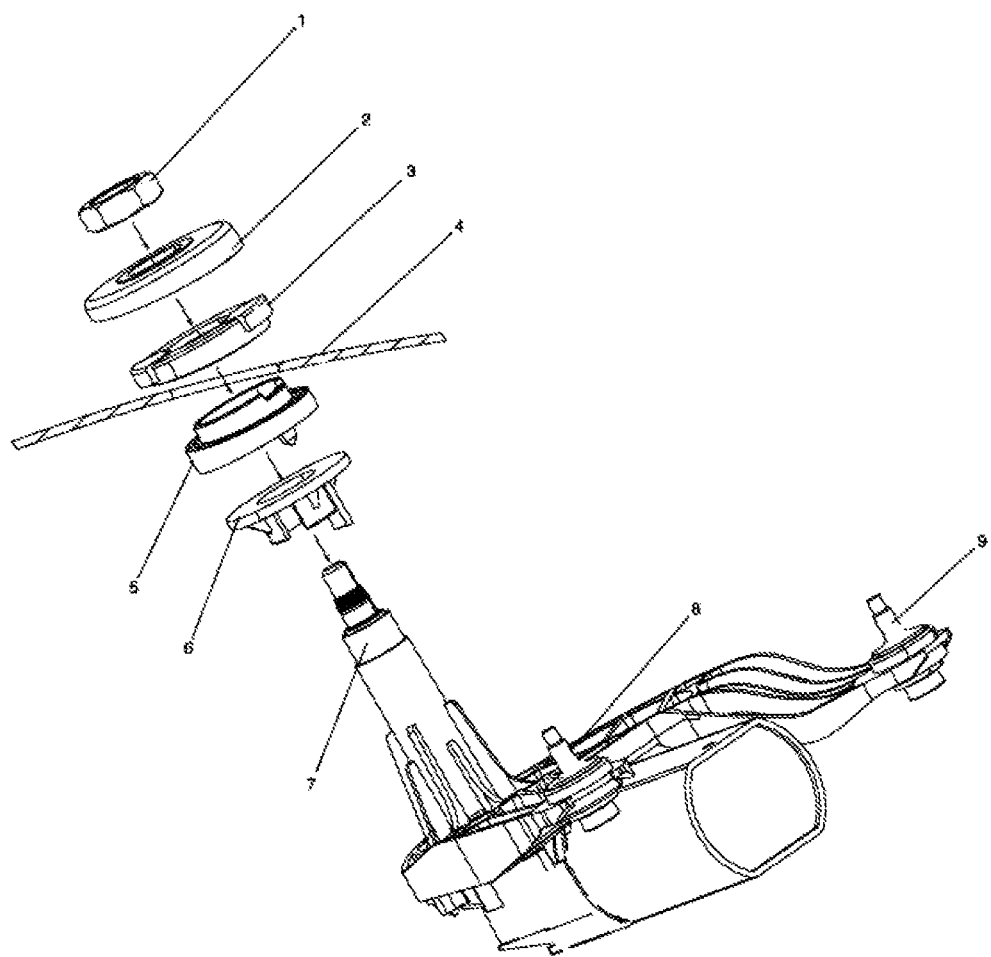
FIG. 1 is the exploded view of the seal assembly with two rubber gasket in the prior art.

FIG. 1 is an exploded view of the seal assembly with two independent rubber gaskets in the prior art. The seal assembly seals the connection region between the shaft assembly passing through the glass of a vehicle window and the glass of the vehicle window. The shaft assembly may be the output shaft assembly 7 of the motor of the vehicle screen wiper (especially the rear wiper). As for the traditional three-fixing-point motor, two of the mounting points are on the vehicle body sheet metal frame (not shown), i.e., the first system structure fixing point 8 and the second system structure fixing point 9, as shown in FIG. 1, and the third mounting point is realized by being fixed through a hole of the glass of the vehicle window. Wherein, the seal assembly comprises: clamp nut 1, shelter cover 2, glass-exterior-side sealing rubber gasket 3, glass of the vehicle window 4, glass-interior-side sealing rubber gasket 5, and rubber-gasket supporting base 6, which are assembled as shown in FIG. 1 to form the seal. As described above, drawbacks of this structures are as follows: firstly the large sealing assembly exposed outside the vehicle body effect greatly the appearance of the vehicle; secondly, the manufacturing tolerance of the glass has a serious impact on the amount of compression of the rubber gaskets on both sides of the glass, thus the seal effectiveness cannot be assured; and finally, the complicated installation parts prone to cause an operation error.

Figure 2:
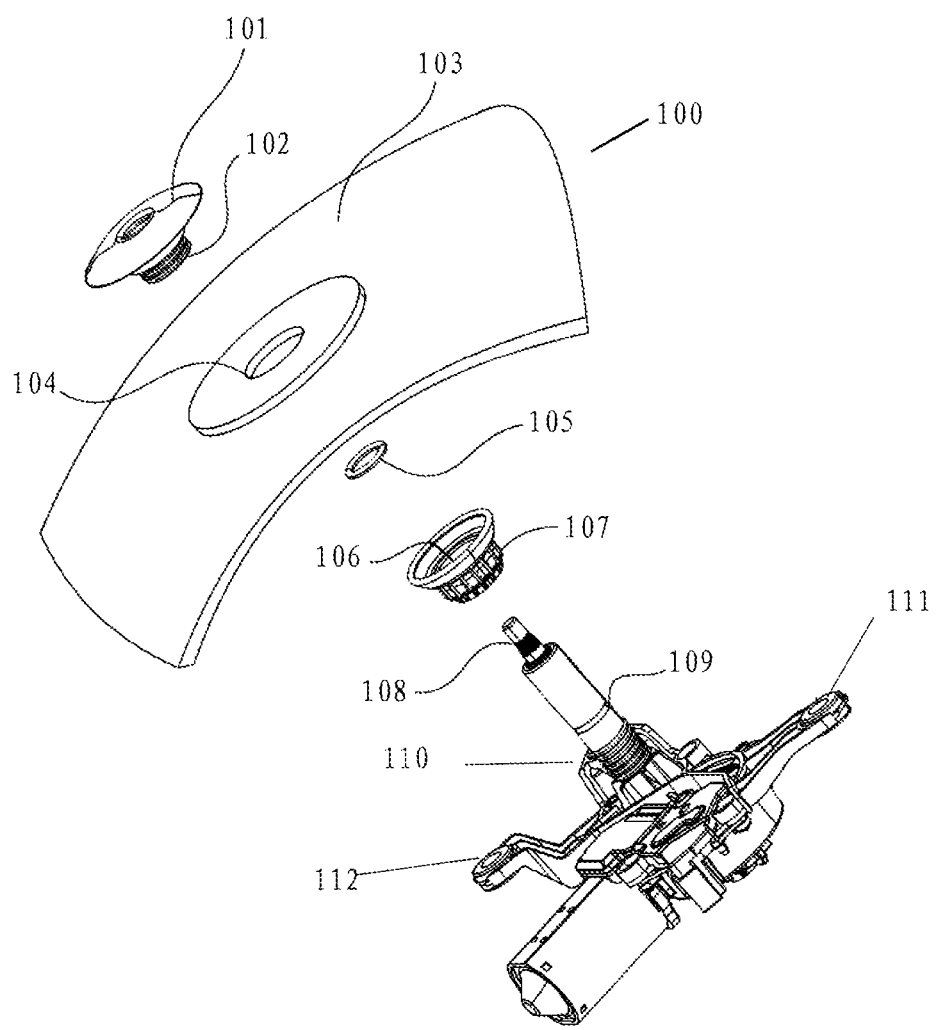
FIG. 2 is the exploded view of the seal assembly according to the present invention.

FIG. 2 is the exploded view of the seal assembly 100 according to the present invention. The seal assembly is especially suitable for sealing a connection region between a shaft assembly 108 and the glass 103. It should be noted that although the seal assembly in the present disclosure is described for the screen wiper system passing through the glass of a vehicle window, but it should be noted that the seal assembly in the disclosure can be used in other situation and sealing a shaft passing though a plate.

Mainly referring to FIG. 2, the shaft assembly 108 passes though an opening 104 of the glass of the vehicle window. The shaft assembly 108 can be the output shaft assembly of the motor of the vehicle screen wiper (especially rear wiper). As in FIG. 2, the two mounting points 111 and 112 of the motor are on the vehicle body, and the third mounting point is formed at the opening of the glass, thus fixing of the motor is accomplished. The output shaft assembly comprises a shaft 113 and a bushing 114 sheathed around the shaft 113. The seal assembly 100 comprises at least an outer seal 101 and an inner rotatable seal 106, wherein in the seal assembly of the present invention, the inner rotatable seal 106 needs to be rotated for the assembling process, thus it is referred to the inner rotatable seal 106.

Figure 3:
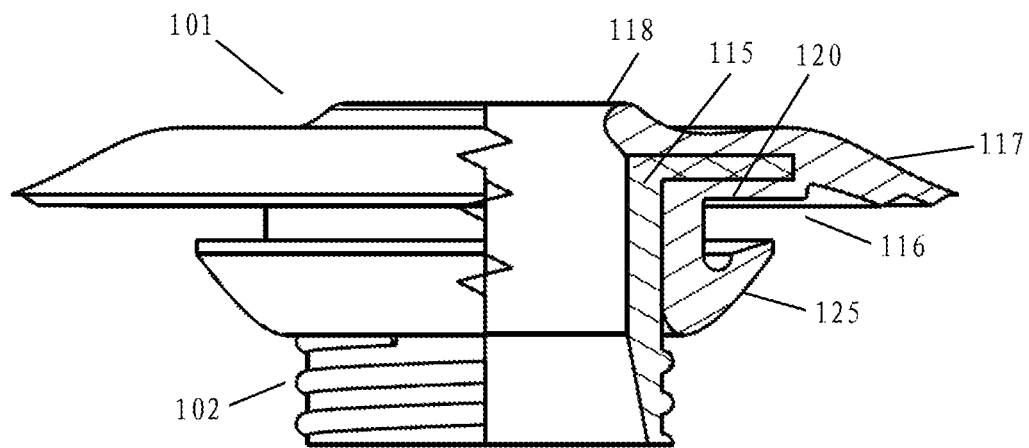
FIG. 3 is the structure cross-section view of the outer seal.
Figure 5:
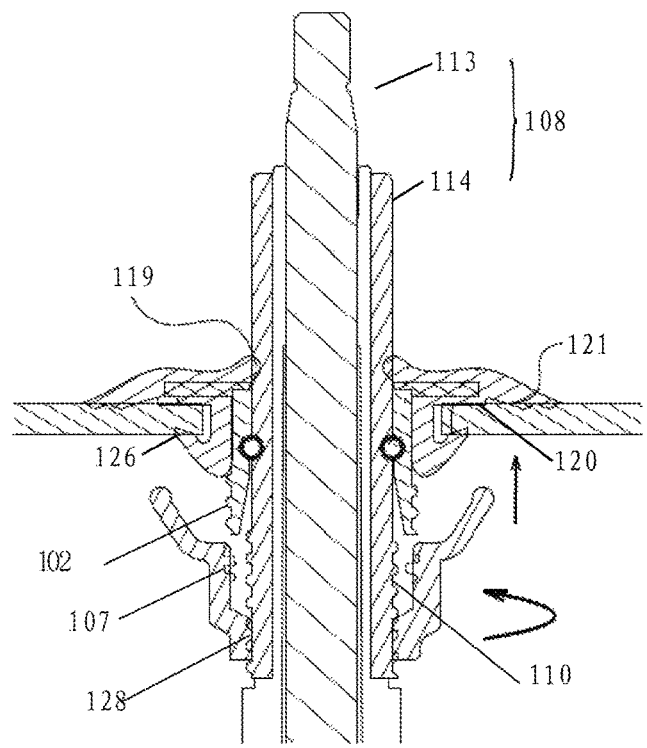
FIG. 5 is the principle diagram of the function structure cross section of the seal assembly, wherein the inner rotatable seal has not been fully assembled.

As in FIGS. 2, 3 and 5, the outer seal 101 has a body portion 115, which is used to support the outer seal on the glass 103. A centre bore along a longitudinal axis is defined in the body portion 115, with the shaft 113 and the bushing 114 extending through the centre bore. The outer seal further comprises a sealing portion 116. The sealing portion 116 of the outer seal 101 is referred to the first sealing portion 116, so as to be distinguished from the sealing portion of the inner rotatable seal 106 described hereinafter. The first sealing portion 116 is formed on the body portion 115 and has an irregular shape as in FIG. 3, which has an extension 117 extending substantially in a radical direction away from the longitudinal axis and a protrusion 118 adjacent to the centre bore. When the bushing 114 having passed though the center bore of the outer seal, the protrusion 118 contacts with the bushing 114 sealingly from outside of the glass to form a first sealing area 119. The extension 117 defines a substantially flat surface, which forms a substantially flat glass positioning feature 120 of the outer seal. When the outer seal is inserted partially into the glass opening from outside, the glass positioning feature 120 engages the exterior surface of the glass to accomplish fixing of the outer seal on the glass. Furthermore, a portion of the extension 117 contacts a portion of the exterior surface of the glass sealingly to form a second sealing area 121.

Figure 4:
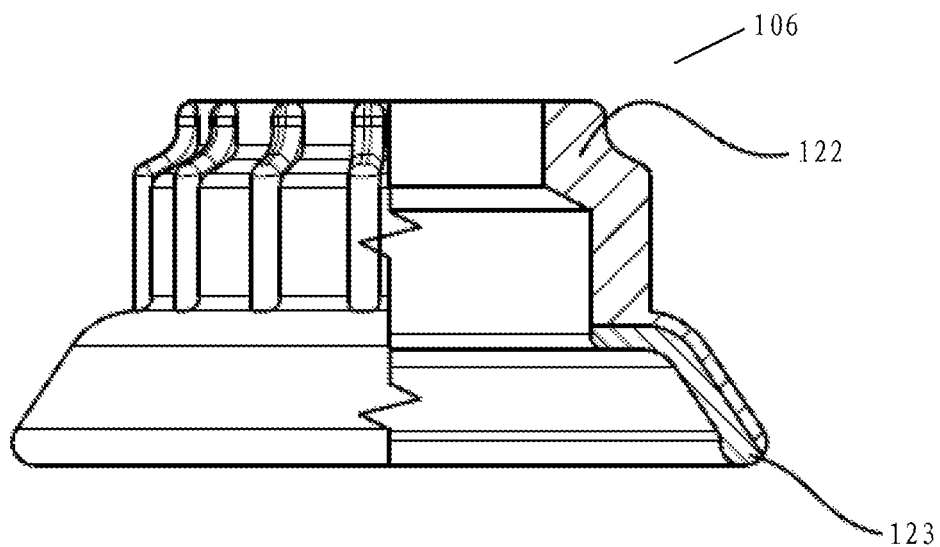
FIG. 4 is the structure cross-section view of the inner rotatable seal.

As in FIGS. 2 and 4, the inner rotatable seal 106 has a body portion 122 and a second sealing portion 123. The body portion is used to support the second sealing portion. A center bore extending along the longitudinal axis is defined in the body portion 122. The shaft and bushing extend though the center bore. The inner rotatable seal and the bushing may be engaged with the respective threads 128 and 110, that is, the inner rotatable seal may have a thread 128, the bushing has a thread 110, and the thread 128 engages with the thread 110. Preferably, the thread 128 is an internal thread and the thread 110 is an external thread. The second sealing portion 123 of the inner rotatable seal 106 extends in the axially direction as well as away from the longitudinal axis, and the second sealing portion contacts interior surface of the glass of the vehicle window sealingly to form a third sealing area 124. The outer seal and the inner rotatable seal may be engaged with the threads 102 and 107 on the respective body portions. Preferably, the thread 102 of the outer seal is an external thread, which is located at end of body portion of the outer seal adjacent to the glass, and the thread 107 is an internal thread, which is located at the substantially middle position of the body portion of the inner rotatable seal. As such, the inner rotatable seal has two portions of threads, that is, the thread 107 used for engaging the thread 102 of the body portion of the outer seal, and the thread 128 used for engaging the thread 110 of the bushing 114.

According to a preferable embodiment, the first sealing portion 116 of the outer seal 101 further has a folding portion 125 extending toward the glass at an angle with respect to the radial direction. The folding portion 125 contacts the interior side of the glass of the vehicle window sealingly to form a fourth sealing area 125, and cooperates with the gals positioning feature of the extension of the first sealing portion, so that the glass of the vehicle window is clipped to make the sealing more reliable.

As in FIGS. 2 and 3, the body portion 115 of the outer seal 101 is made of hard plastic and the first sealing portion 116 is made of soft rubber. The body portion of the outer seal and the first sealing portion are overmolded as one piece. Similarly, the body portion 122 of the inner rotatable seal 106 is made of hard plastic and the second sealing portion 123 is made of soft rubber. The body portion of the inner rotatable seal and the second sealing portion are overmolded as one piece.

The threads 102 and 107 of the outer seal and the inner rotatable seal may be corresponding ordinary threads with long travel distance. But according to the actual situation, the threads of the outer seal and the inner rotatable seal may be corresponding threads having several portions with short travel distance. Preferably, the seal assembly 100 further comprises an annular sealing ring 105, which is positioned in an annular slot 109 of the bushing so as to be engaged between the bushing and the body portion of the outer seal to form a fifth sealing area 127. The annular sealing ring engages with the bushing and the outer seal in interference fit.

Figure 6:
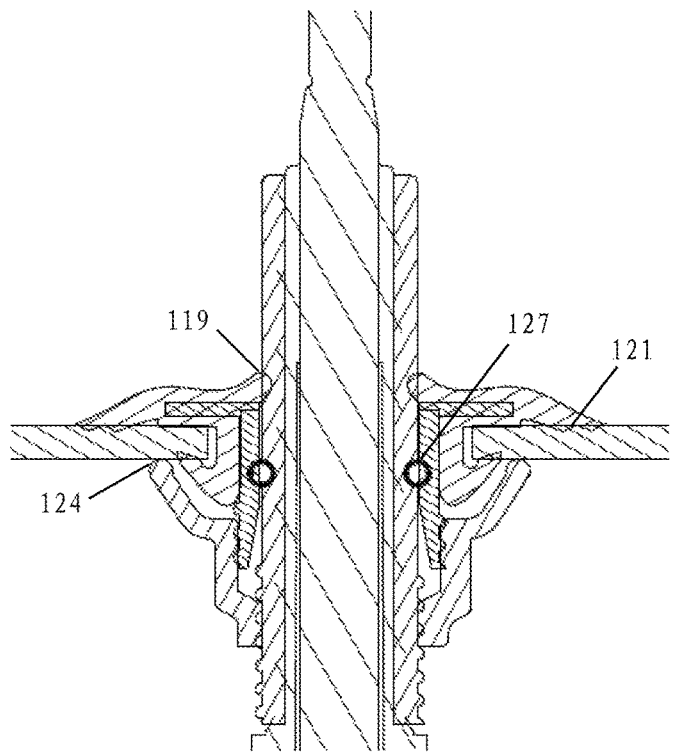
FIG. 6 is the principle diagram of the function structure cross section of the seal assembly, wherein inner rotatable seal is in its final assembled position.

FIGS. 5 and 6 are principle diagrams of the functional structure cross section, wherein the inner rotatable seal is in its unassembled state in FIG. 5 and the inner rotatable seal is in its final assembled position in FIG. 6. It can be clearly seen from FIG. 5 the first to fifth sealing area 119, 121, 124, 126 and 127. The clamp nut and plastic base part for the seal of the seal assembly in the existed technology is eliminated in this structure, thus it is advantages in the structure and appearance.

Referring to FIGS. 2, 5 and 6, a method for assembling the seal assembly in the present invention comprises:

Step 1, pushing the outer seal 101 from outside of the glass of the vehicle window into the opening 104 of the glass, to make the outer seal 101 conform to the exterior surface of the glass 103; preferably, making glass position feature 120 of the outer seal engage with the glass, to assist the positioning of the outer seal relative to the glass of the vehicle window;

Step 2, assembling the inner rotatable seal to the shaft assembly by engaging the thread 128 of the inner rotatable seal with the thread 110 of the bushing;

Step 3, which is selectable, preloading the annular sealing ring 105 into the annular positioning slot of the bushing, to preload the annular sealing ring, which also prevents the inner rotatable seal 106 from falling off during transportation. This step is special for the embodiment with the annular sealing ring;

Step 4, passing the shaft assembly 108 through the center bore of the outer seal;

Step 5, rotating the inner rotatable seal 106 towards the glass, until it is engaged with the thread 102 of the outer seal and tightened, so that the inner rotatable seal press against the glass at the interior side of glass and forms the sealing. Thereby the assembling of the seal assemble 100 is finished.

The seal assembly according to the invention is described by means of preferred embodiments. As understood by those skilled in the art, the detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A seal assembly for sealing connection region between a glass and a shaft assembly passing through the glass, said shaft assembly comprising a shaft and a threaded bushing around the shaft, the seal assembly comprising:
   an outer seal, having a body portion used to be supported on the glass, the outer seal further comprising at least one first sealing portion to form at least one sealing area;
   an inner rotatable seal, having a body portion with a thread for engaging a thread of the bushing, the inner rotatable seal further comprising at least one second sealing portion to form at least one sealing area,
   wherein the body portion of the outer seal and the body portion of the inner rotatable seal each has corresponding threads for engaging the outer seal with the inner rotatable seal,
   wherein the thread on the body portion of the outer seal is an external thread, and the thread on the body portion of the inner rotatable seal is an internal thread.

2. The seal assembly of claim 1, wherein the outer seal has a centre bore defined along a longitudinal axis, the shaft and the bushing extending through the centre bore, the first sealing portion of the outer seal has an extension extending substantially in a radical direction away from the longitudinal axis and a protrusion adjacent to the centre bore, wherein the protrusion contacts the bushing sealingly from outside of the glass to form a first sealing area, and a portion of the extension contacts the exterior surface of the glass to form a second sealing area.

3. The seal assembly of claim 1, wherein the inner rotatable seal has a centre bore defined along a longitudinal axis, and the shaft and the bushing extending through the centre bore, the sealing portion extends in an axial direction as well as away from the longitudinal axis, and contacts interior surface of the glass to form a third sealing area.

4. The seal assembly of claim 2, wherein the extension of the first sealing portion further comprises a flat surface which forms a glass positioning feature of the outer seal.

5. The seal assembly of claim 2, wherein the first sealing portion of the outer seal further comprises a folding portion extending towards the glass at an angle with respect to the radical direction, which contacts the interior surface of the glass to form a fourth sealing area, and which cooperates with the extension of the first sealing portion to clip the glass.

6. The seal assembly of claim 1, further comprising an annular sealing ring, which is positioned in an annular slot of the bushing so as to be engaged between the bushing and the body portion of the outer seal to form a fifth sealing area.

7. The seal assembly of claim 1, wherein the body portion of the outer seal is made of hard plastic and the first sealing portion is made of soft rubber, and the body portion of the outer seal and the first sealing portion are overmolded as one piece.

8. The seal assembly of claim 1, wherein the body portion of the inner rotatable seal is made of hard plastic and the second sealing portion is made of soft rubber, and the body portion of the inner rotatable seal and the second sealing portion are overmolded as one piece.

9. The seal assembly of claim 1, wherein each of the thread of the outer seal and the thread of the inner rotatable seal is a continuous thread.

10. The seal assembly of claim 1, wherein the thread of the outer seal and the thread of the inner rotatable seal are corresponding threads having several portions.

11. The seal assembly of claim 7, wherein the annular sealing ring engages with the bushing and the outer seal in interference fit.

12. The seal assembly of claim 1, wherein the shaft assembly is output shaft assembly of a screen wiper motor.

13. A seal assembly for sealing connection region between a glass and a shaft assembly passing through the glass, said shaft assembly comprising a shaft and a threaded bushing around the shaft, the seal assembly comprising:
   an outer seal, having a body portion used to be supported on the glass, the outer seal further comprising at least one first sealing portion to form at least one sealing area;
   an inner rotatable seal, having a body portion with a thread for engaging a thread of the bushing, the inner rotatable seal further comprising at least one second sealing portion to form at least one sealing area,
   wherein the body portion of the outer seal and the body portion of the inner rotatable seal each has corresponding threads for engaging the outer seal with the inner rotatable seal,
   wherein the outer seal has a centre bore defined along a longitudinal axis, the shaft and the bushing extending through the centre bore, the first sealing portion of the outer seal has an extension extending substantially in a radical direction away from the longitudinal axis and a protrusion adjacent to the centre bore, wherein the protrusion contacts the bushing sealingly from outside of the glass to form a first sealing area, and a portion of the extension contacts the exterior surface of the glass to form a second sealing area, and
   wherein the extension of the first sealing portion further comprises a flat surface which forms a glass positioning feature of the outer seal.

14. A seal assembly for sealing connection region between a glass and a shaft assembly passing through the glass, said shaft assembly comprising a shaft and a threaded bushing around the shaft, the seal assembly comprising:

an outer seal, having a body portion used to be supported on the glass, the outer seal further comprising at least one first sealing portion to form at least one sealing area;
an inner rotatable seal, having a body portion with a thread for engaging a thread of the bushing, the inner rotatable seal further comprising at least one second sealing portion to form at least one sealing area,
wherein the body portion of the outer seal and the body portion of the inner rotatable seal each has corresponding threads for engaging the outer seal with the inner rotatable seal,
wherein the body portion of the outer seal is made of hard plastic and the first sealing portion is made of soft rubber, and the body portion of the outer seal and the first sealing portion are overmolded as one piece, and
wherein the annular sealing ring engages with the bushing and the outer seal in interference fit.

* * * * *